United States Patent [19]
DeRozier et al.

[11] Patent Number: 5,620,635
[45] Date of Patent: Apr. 15, 1997

[54] OPHTHALMIC LENS MANUFACTURING EQUIPMENT AND METHOD

[76] Inventors: Gaston DeRozier, 57, avenue de Conde, 94106 Saint Maur Cedex, France; Kenneth W. Pugh, 1124 NW. 81st Ter., Plantation, Fla. 33322

[21] Appl. No.: 371,159

[22] Filed: Jan. 11, 1995

(Under 37 CFR 1.47)

[51] Int. Cl.⁶ ................................................. B29D 11/00
[52] U.S. Cl. ........................... 264/2.5; 249/63; 249/102; 249/134; 264/DIG. 78; 425/190; 425/577; 425/808; 425/DIG. 60
[58] Field of Search ............................ 425/808, DIG. 60, 425/577, 190, 193; 264/2.5, 101, DIG. 78; 249/63, 102, 134

[56] References Cited

U.S. PATENT DOCUMENTS

| | | |
|---|---|---|
| 3,749,536 | 7/1973 | Remscheid et al. . |
| 4,008,031 | 2/1977 | Weber . |
| 4,014,972 | 3/1977 | Rentz . |
| 4,229,390 | 10/1980 | Neefe . |
| 4,364,878 | 12/1982 | Laliberte et al. . |
| 4,383,672 | 5/1983 | Kreuttner ............................ 425/808 |
| 4,540,534 | 9/1985 | Grendol . |
| 4,614,630 | 9/1986 | Pluim, Jr. . |
| 4,664,854 | 5/1987 | Bakalar . |
| 4,704,079 | 11/1987 | Pluim, Jr. . |
| 4,732,553 | 3/1988 | Hofer . |
| 4,737,096 | 4/1988 | Poorten . |
| 4,761,257 | 8/1988 | Bunn . |
| 4,778,632 | 10/1988 | Bakalar . |
| 4,783,041 | 11/1988 | Sakaida et al. . |
| 4,828,769 | 5/1989 | Maus et al. . |
| 4,839,122 | 6/1989 | Weaver . |
| 4,900,242 | 2/1990 | Maus et al. . |
| 4,941,748 | 7/1990 | Pusch et al. . |
| 4,987,332 | 1/1991 | Yamamoto et al. . |
| 4,990,077 | 2/1991 | Morita . |
| 5,039,298 | 8/1991 | Takakusaki et al. . |
| 5,061,174 | 10/1991 | Gellert . |
| 5,066,449 | 11/1991 | Kato et al. . |
| 5,100,590 | 3/1992 | Ruhlin . |
| 5,104,590 | 4/1992 | Blake . |
| 5,132,071 | 7/1992 | Sorensen . |
| 5,169,470 | 12/1992 | Goldberg . |

*Primary Examiner*—Mathieu D. Vargot
*Attorney, Agent, or Firm*—Quarles & Brady

[57] ABSTRACT

Ophthalmic lens manufacturing equipment includes lens die assemblies constructed to accommodate fragile, high quality glass lens dies. The lens die supports of the assemblies provide a series of grooves of critically small widths on their interface surfaces to apply vacuum pressure from an external source to the backs of the lens dies and thereby hold them in place. The vacuum securement also enables rapid lens die changeover using robotic arms.

16 Claims, 4 Drawing Sheets

FIG. 1

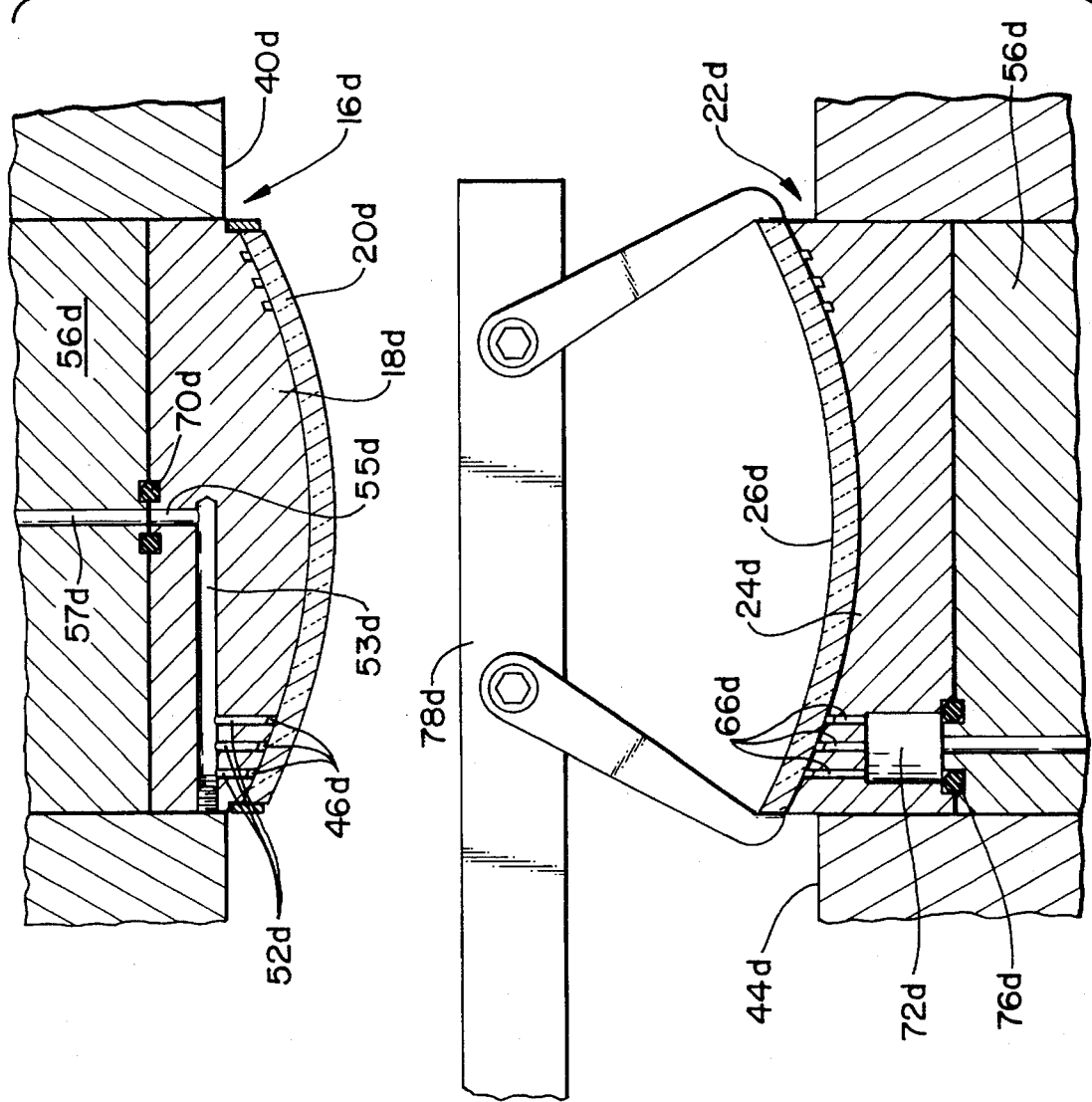

5,620,635

OPHTHALMIC LENS MANUFACTURING EQUIPMENT AND METHOD

FIELD OF THE INVENTION

The invention relates to method and apparatus for producing ophthalmic lenses. The invention is particularly related to lens die assemblies for use in the production of ophthalmic lenses.

BACKGROUND OF THE INVENTION

In the manufacture of ophthalmic lenses, a thermoplastic, such as a polycarbonate resin, is typically injected through a gate to a molding cavity defined between two compressible mold blocks that support mold dies having optically finished surfaces to be impressed on the injected thermoplastic. A discussion of the production of ophthalmic lenses by this conventional process can be found in U.S. Pat. No. 4,900,242 to Maus et al., which is incorporated by reference herein.

Glass is a preferred material for constructing lens dies used to produce ophthalmic lenses. Glass lens dies can be finely polished and therefore produce ophthalmic lenses with superior optical properties.

Glass lens dies also have superior insulating capabilities and maintain a more stable heating environment and more efficiently maintain the temperature in the mold cavity during the lens formation. In the higher temperature cavity, the formed lens has a thinner skin and correspondingly reduced surface stresses.

Conventional techniques for securing lens dies to their associated supports are not well suited for securing relatively fragile lens dies made of glass. The instances of breakage using known lens die mounting systems result in increased operating costs and in some circumstances render use of glass lens dies economically infeasible.

A glass lens die can be held against a mold block by a surrounding retaining ring or sleeve, which is, in turn, secured to the mold block. However, this mounting system requires appreciable time to remove and replace the lens die.

It is desirable to interchange different lens dies during lens production to provide lenses of different powers and other optical characteristics. The down time associated with such changeovers is typically on the order of several minutes and sometimes hours and can typically only be cost-justified in lens manufacture when a significant quantity of lenses have been produced using a mounted lens die before changeover occurs.

Adhesives present an alternative for mounting glass dies to underlying supports. However, the unpredictable and relatively uncontrollable variation in the adhesive thickness along the mounting interface creates points of leverage and stresses that often break glass lens dies. The adhesives also make the underlying support difficult to reuse with other lens dies, making frequent changeover difficult.

SUMMARY OF THE INVENTION

It is an object of the invention to provide ophthalmic lens manufacturing equipment that improves the quality of the finished lens.

It is another object of the invention to provide ophthalmic lens manufacturing equipment that reduces the surface stresses in the finished lens.

It is still another object of the invention to provide ophthalmic lens manufacturing equipment that can utilize fragile, high quality lens dies, such as those made of glass or ceramics.

It is yet another object of the invention to provide ophthalmic lens manufacturing equipment that permits selective production of ophthalmic lenses with different powers and other optical characteristics.

These and other objects of the invention are achieved by lens manufacturing apparatus including an ophthalmic lens die assembly having a lens die, preferably made of a high quality glass, removably engaging a lens die support. The lens die support has a channel leading from an interface surface between the lens die and the support to an external vacuum source to secure the lens die by vacuum pressure during the formation of the ophthalmic lens.

The vacuum channel preferably terminates at the interface surface of the support in a series of grooves that transmit the suction force across the interface of the die support and the lens die. These grooves have critical widths. It is ordinarily desirable to maximize the surface area to which the vacuum pressure is applied to increase the holding force that secures the lens die. This aim would therefore suggest maximizing the width of the grooves or other apertures through which the vacuum pressure is applied. However, in the high temperature environment of the lens formation cavity, an appreciable temperature gradient exists across the groove width. Stresses associated with the thermal gradient form on the surface of the lens die and can crack a fragile glass lens die. The invention provides sufficient surface area to achieve adequate holding force while permitting sufficiently small gaps to avoid fracture.

The lens die can have a solid and uninterrupted support interface surface that is entirely engaged by the support to enhance the suction efficiency. The interface surface can be spherical and provide a plurality of concentric circular grooves on the interface surface of the support. For glass lens dies used in normal heating environments, the suction grooves preferably have widths of less than 1.0 mm and most preferably around 0.6 mm.

The suction grooves can be provided in a variety of geometries. A groove cross crossing at or near the center of the interface surface of the support permits the centralization of the vacuum channel while distributing the vacuum pressure to the peripheral areas of the interface surface. The groove cross can also provide symmetric application of the suction pressure to help align the lens die on the interface surface of the support. The groove cross can also be used in conjunction with a series of concentric circular grooves to distribute the vacuum pressure to the circular grooves from a single, central vacuum channel, and to thereby avoid the need for a plurality of vacuum channels.

The invention not only allows reliable and cost effective use of fragile glass lens dies; it also permits easier interchange of lens dies of different powers and other optical characteristics. The vacuum pressure can be temporarily removed from the interface between production cycles of the lens manufacturing equipment to permit easy removal of a mounted lens die and substitution of a replacement lens die. The interchange preferably occurs during the transition time of the production cycle when the mold halves are separated to allow removal of finished lenses so that the process does not have to be interrupted for lens die changeover.

Thus, the ophthalmic lens manufacturing equipment of the invention permits use of glass and other fragile lens dies to provide higher quality lenses. The equipment also allows rapid exchange of the lens dies to enhance production efficiency and reduce operating and inventory costs.

BRIEF DESCRIPTION OF THE DRAWINGS

A more thorough understanding of the different aspects of the invention and its preferred implementations can be gained from a reading of the following detailed description in conjunction with the appended drawings, in which:

FIG. 1 is a sectional view of ophthalmic lens coining apparatus incorporating die assemblies according to the invention;

FIG. 6 is a sectional view of ophthalmic lens coining mold halves, separated to permit interchange of lens dies by a robotic arm.

DETAILED DESCRIPTION OF PREFERRED EMBODIMENTS

Figure 3:
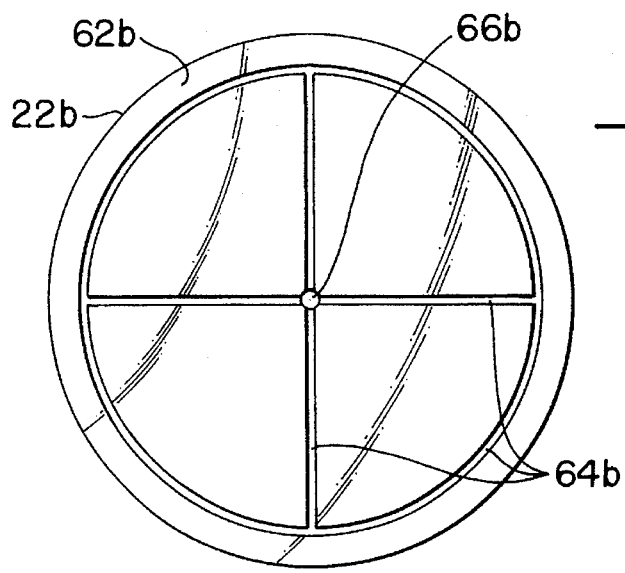
FIG. 3 is a front elevational view of a lens die support having suction grooves in a second configuration.

The invention relates to method and apparatus for producing high quality ophthalmic lenses. The invention has application to the production of different ophthalmic lenses, including semifinished lens blanks and finished single vision lenses. While the lens producing equipment can be utilized in the injection molding of ophthalmic lenses, the preferred embodiments of the invention are presented in this disclosure in the context of variable-cavity coining.

Throughout the figures of the drawings, like numerals are used to reference like structure. The same reference numbers may be followed by lower case letters to distinguish between different embodiments of the same referenced structure.

Figure 1:
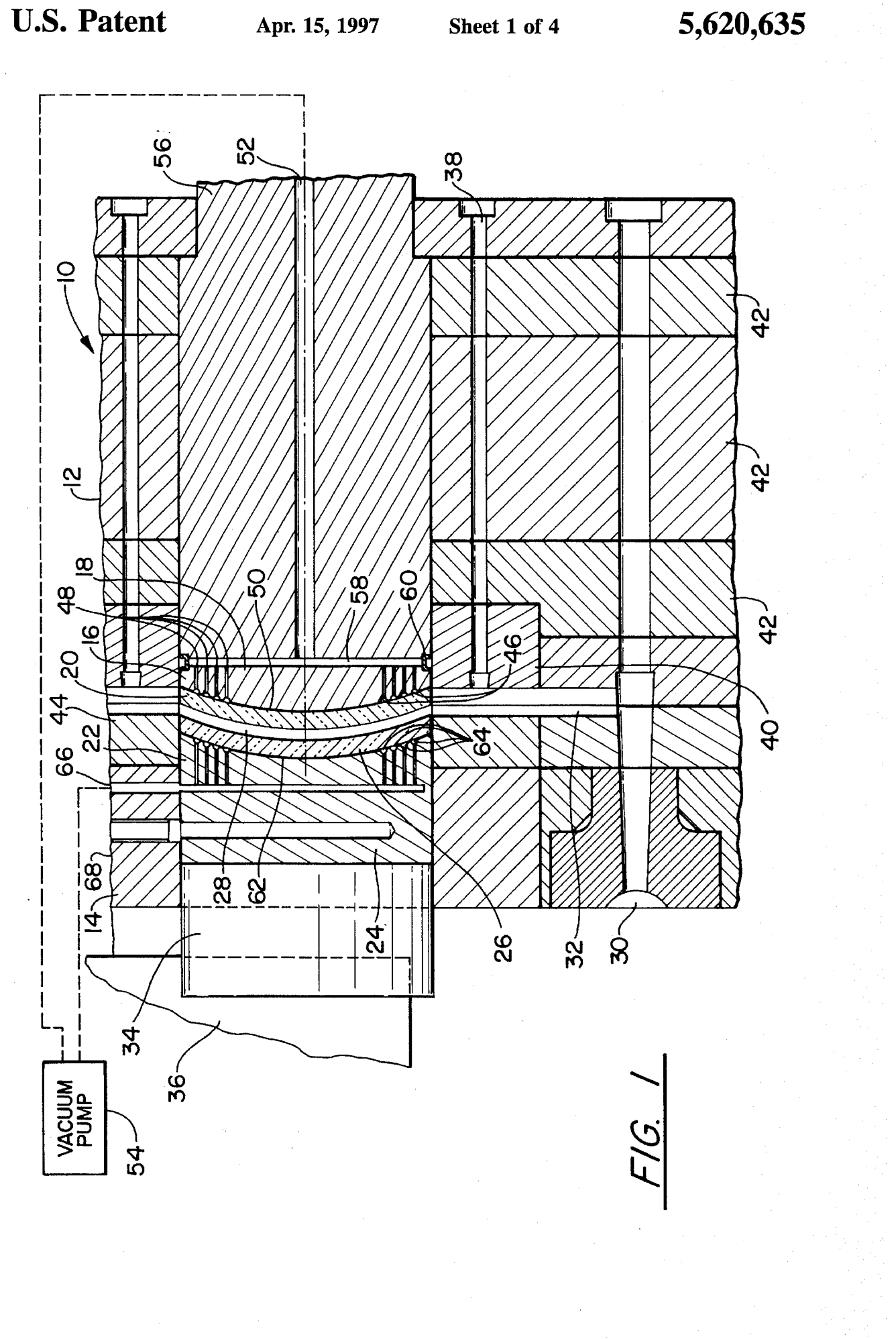

Referring to the figures and particularly to FIG. 1, the invention can be implemented in coining apparatus 10 for forming ophthalmic lenses. A discussion of particular details of the coining process are set forth in Bakalar, U.S. Pat. No. 4,664,854, which is incorporated by reference.

Generally, the coining apparatus 10 can include a frame having a moveable half 12 and a fixed half 14. The moveable frame half 12 supports a male mold assembly 16. The male mold assembly 16 includes a male support 18 and a male lens die 20 having a convex molding surface conforming to a major surface of the lens to be molded. The fixed frame half 14 supports a female mold assembly 22. The female mold assembly 22 includes a female support 24 and a female lens die 26 having a concave surface conforming to the desired curvature of the opposite major surface of the lens to be formed.

The molding surfaces of the lens dies 20, 26 should be uninterrupted and continuous within their peripheries with no holes or other breaks in the surfaces so that the ophthalmic surfaces produced on the lenses are continuous and free from imperfection. As used throughout the specification and claims, the uninterrupted molding surfaces refer to the substantially blemish-free quality of the surfaces, which have no cracks, pits or other inadvertent disruptions as well as no intended breaks such as channels, holes or slots. For the production of semifinished lens blanks, the convex male mold assembly 16 can simply include a single-piece mold member for forming an unfinished concave surface on the lens blank. The curvature of the lens dies on the moveable and fixed halves 12, 14 can also be reversed.

In the coining process, the mold cavity 28 defined by the space between the mold assemblies 16, 22 is initially spaced larger than the desired size of the lens blank to be produced. Thermoplastic lens material, such as polycarbonate resin, is introduced through a sprue 30 to a gate 32 leading to the cavity 28.

The material fills the cavity 28, and the cavity 28 is then further compressed. An inclined plane interface between a slider 34 of the female mold assembly 22 and a driver 36 of a hydraulic cylinder transfers compressive force to close the cavity 28 to the desired finished size for the lens blank.

When lens formation is complete, the moveable frame half 12 is separated from the fixed frame half 14, exposing the completed lens blank. An ejector 38 can be used to push the lens from the mold for subsequent removal and storage.

The male support 18 is preferably slidingly positioned by a slide ring 40 secured to the mold frame either directly or through a series of spacers 42. The slide ring 40 can be removably secured to the mold frame by screws (not shown) or other known fastening means. The male support 18 can alternatively be secured to the mold frame by directly screwing a threaded bore in the support member onto a stud protruding from the mold frame. The male support 18 can be mounted to a cylinder 56 that is moveable to push the male lens die 20 out from the slide ring 40 but can be fixed relative to the mold frame during lens formation. Any suitable means for securing the male support 18 to the mold frame is within the scope of the invention, but securement that permits the male support 18 to slide so that it may expose the edges of the lens die 20 for removal is preferred.

The female support 24 can be secured to the associated mold frame or slide ring 44 in similar fashion. In the coining process, the female support 24 is slidingly positioned in the slide ring 44 to permit compression of the cavity 28 during lens formation, and this structure can also be used to expose the edges of the female lens die 26 for lens die exchange.

According to the invention, the lens dies 20, 26 are secured to their respective supports 18, 22 by vacuum pressure. The male support can provide a series of concentric grooves 46 ductively connected to vacuum channels 48 extending from a convex lens interface surface 50 to the back of the male support 18. The sliding cylinder 56 can provide a vacuum channel 52 for supplying vacuum pressure from an external source, such as a vacuum pump 54, to a manifold 58 formed between the male support be and the cylinder 56 by a spacer gasket 60.

The concave backing surface of the male lens die 20 is preferably smooth, continuous and uninterrupted with no holes or other breaks along the surface. The backing surface is entirely engaged, except at the grooves 46 themselves, by the interface surface 50 of the male support 18 to enhance the securing efficiency of the vacuum pressure. The radius of curvature of the convex back of the lens die 20 and the radius of curvature of the interface surface 50 are closely matched, with a preferred tolerance of difference being less than 0.2 mm.

The female mold assembly 22 can be similarly configured. The interface surface 62 of the female support 24 should be closely matched to the convex backing of the female lens die 26. A series of grooves 64 are formed on the interface surface 62 and link to the external vacuum 54 source through a vacuum channel 66. The vacuum channel 66 can extend laterally though a spacer 68 to an external port for connection to the vacuum pump 54. Any passage path from a support outlet to an external vacuum source is adequate for purposes of the invention.

Figure 2:
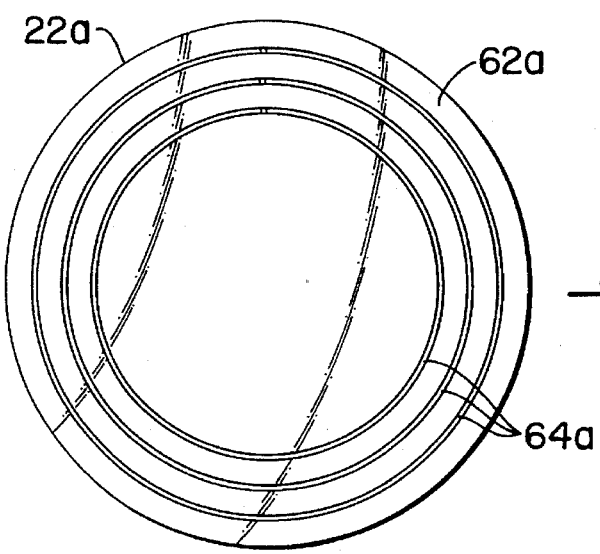
FIG. 2 is a front elevational view of a lens die support having suction grooves in a first configuration.

The suction grooves formed in the lens die interface surface of each support can be arranged in a variety of geometries to secure and center a lens die. Referring to FIG. 2, the grooves 64a can be arranged in a series of concentric circles. The circular configuration generally provides a symmetric distribution of the suction and can center a lens die when seated on the interface surface 62a. The lens die should have a substantially mating back surface to engage the lens die interface surface 62a to increase the effectiveness of the suction in securing the lens die and minimizing the possibility of slippage.

Referring to FIG. 3, the grooves 64b can alternatively or additionally form a cross at the center of the interface surface 62b. This configuration further increases the effectiveness of the suction in securing the lens die and permits the use of a single vacuum channel 66b extending from a center of the interface surface. The cross also permits centralization of the vacuum channel 66b while allowing distribution of the vacuum pressure to the outer areas of the interface surface 62b. The centralized vacuum channel 66b can also facilitate manufacture of the support 22b.

Figure 4:
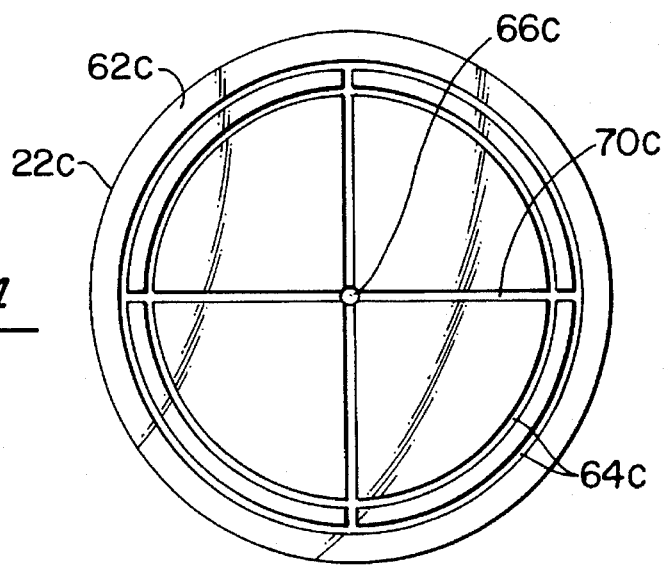
FIG. 4 is a front elevational view of a lens die support having suction grooves in a third configuration.

Referring to FIG. 4, the groove cross 70 can be used to ductively link a series of concentric grooves 64c, thereby providing enhanced centering capabilities and minimizing the number of vacuum channels 66c needed within the support 22c.

The width of each groove on the interface surface of a lens die support can be critical to optimal performance of the vacuum pressure securement. If the width is too great, a significant thermal gradient is created under the high temperature conditions of the molding process. This thermal gradient creates a corresponding stress gradient, which can cause fracture in lens dies made of relatively fragile material, such as glass. If the groove width is kept sufficiently narrow to avoid the critical thermal gradient, glass lens dies can be employed and the superior surface quality and thermal insulating characteristics of these lens dies can be realized. While widths up to approximately 2.0 mm can be used in circular groove geometries, 0.6 mm is a preferred width for both circular and cross groove configurations to avoid fracturing thermal gradients while providing adequate vacuum pressure to securely hold the lens die during the molding process.

The groove widths can be significant in controlling thermal gradients on the surface of the lens die and should be minimized for materials, such as glass, that are particularly susceptible to fracture under such thermal variations. The preferred geometries provide an opportunity to achieve sufficient application surface area for the vacuum pressure to generate requisite holding force while avoiding temperature gradients that can create fracturing stresses in the secured lens die.

As the groove widths decrease to avoid fracturing thermal stresses, a corresponding increase in groove quantities must result. For example, for a circular lens die assembly having an 8.1 cm diameter, three concentric circles having a 0.6 mm width and respective diameters of 7.5 cm, 7.1 cm and 6.5 cm can hold the lens die with the application of more than 25 in.Hg vacuum, and preferably approximately 27 in.Hg vacuum.

For polycarbonate resin in the conventional mold cavity, temperatures can range from 520° F. to 580° F. with lens die temperatures of 150° F. to 250° F. Under these operating conditions, it is preferred to have groove widths of less than 1.0 mm and lens die thicknesses of at least 3.0 mm. For the formation of lenses requiring minor impressions from the lens die, such as negative power lenses, the thin portion of the lens die can be set at the minimum 3.0 mm thickness, and thicker lens die peripheries can be provided.

With use of proper groove widths, the lens die supports permit the use of fragile, high quality glass lens dies to produce high quality ophthalmic lenses. The vacuum pressure securement also enables quicker changeover time in exchanging lens dies in the lens forming equipment.

Figure 5:
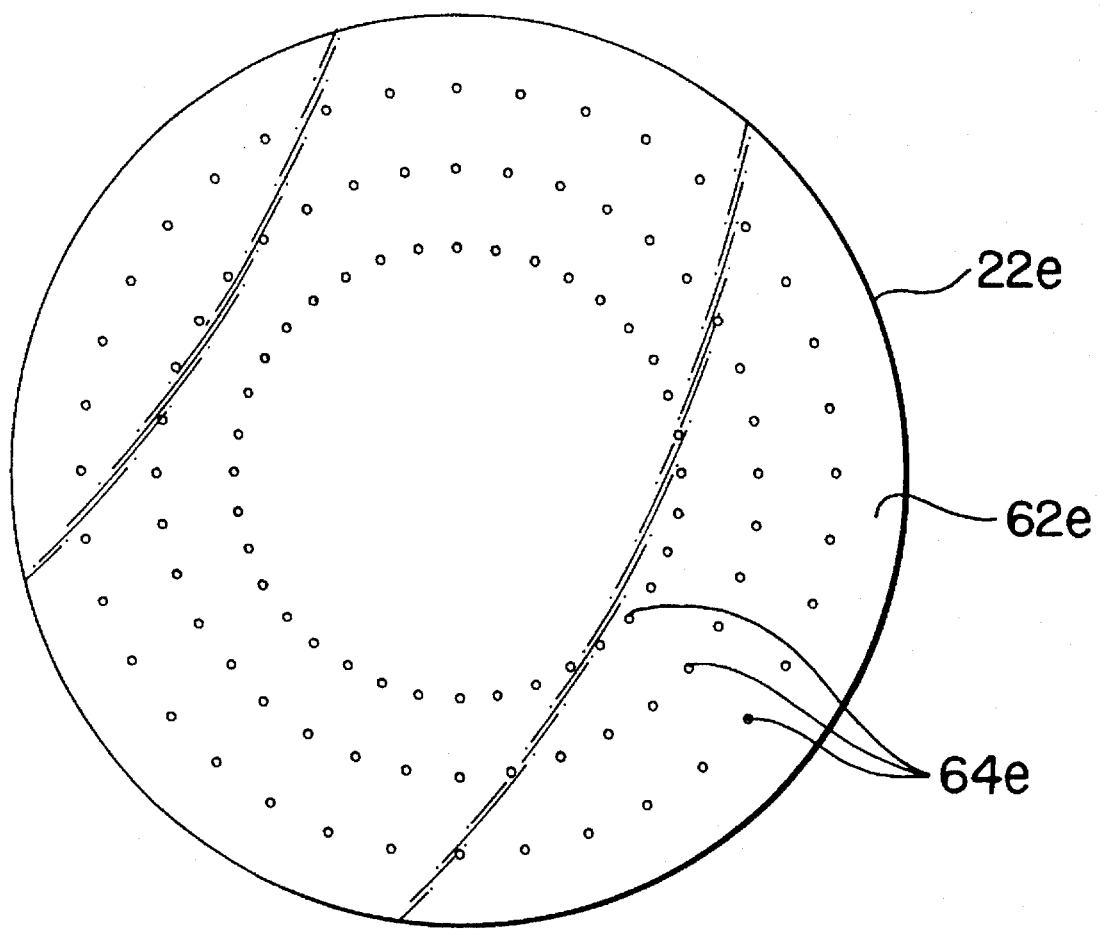
FIG. 5 is a front elevational view of a lens die support having a plurality of suction holes.

Referring to FIG. 5, the lens die support 22e can provide suction to the interface 62e through a plurality of small suction holes 64e preferably bored through the support to ductively join the vacuum channel in the same manner as the vacuum channels 48, as shown in FIG. 1. The suction holes should have a diameter less than 1.0 mm and preferably around 0.6 mm. The holes can be arranged in geometries as illustrated in FIGS. 2–4 or can cover substantially the entire interface surface.

Referring to FIG. 6, the lens forming equipment can be constructed to extend the lens die assemblies 16d, 22d from the surrounding slide rings 40d, 44d so that the peripheral edges of the lens dies 20d, 26d are exposed. The lens die supports 18d, 24d can be mounted on movable cylinders, connected to the mold frame (not shown), which can advance the supports 18d, 24d outwardly to expose the lens dies. The movable cylinders 56d can be fixed during lens formation or can provide movement as part of the formation process, such as during a coining process. In this regard, slider blocks generally used for moving die assemblies in coining processes can also be used to extend a lens die from the surrounding slide ring to expose the lens die periphery.

The supports 18d, 24d also include alternative vacuum channel configurations. The male support 18d has a series of channels 52d extending from the interface surface grooves 46d to a radial channel 53d leading to the center of the support for connection to an outlet channel 55d aligned with a vacuum channel 57d of the cylinder 56d. The junction can be sealed by an o-ring 70d.

The female support 24d provides a series of channels 66d extending from the interface surface to an enlarged port 72d that aligns with an offset vacuum channel 74d in the cylinder 56d. The junction can again be sealed with a gasket or o-ring 76d.

To minimize production downtime, it is desirable to effect lens die changeover during the already existing idle period when the mold assemblies are separated for removal of finished lens blanks. After the lens blank has been ejected, the edge of the lens die 26d to be removed can be grasped by a remover, such as a robotic arm 78d. The remover can alternatively be a hand or any other structure adapted to grip a lens die and remove it from a support. The vacuum pressure is relieved to avoid resistance to the removal from the support 24d and the existing lens die 26d can be extracted. An inserter, such as the same or a different robotic arm, can supply a replacement die by holding its peripheral edge, mounting it to the support and re-establishing vacuum pressure to secure the lens die. The inserter can alternatively be a hand or any other structure adapted to grip an edge of a lens die and insert it on a support. The same process can be performed for the male lens die assembly 16d.

While not as important for the removal of lens dies, it is critical that the insertion of replacement lens dies be performed by their edges to avoid contamination of the highly polished lens-forming surfaces of the lens dies. Contact with the molding surface can cause irreparable defects in lens blanks formed from a contaminated lens die. Accordingly, automated peripheral handling is preferred over manual alternatives.

By utilizing automated robotic systems to exchange lens dies, it is possible to accomplish changeover rapidly within the few seconds available during the lens ejectment phase of the production cycle. The changeover can avoid interruption to the process and save considerable operating costs. It also becomes realistic to "custom" manufacture specified quantities of lenses having particular optical properties to fill known order requirements. Additional blanks no longer have to be manufactured cost justify a lens die changeover, and operating costs associated with inventory storage and control are correspondingly reduced.

Although the description of the various aspects of the invention has been given with reference to particular embodiments, including what are presently considered preferred embodiments, this description should not be construed as limiting the scope of this invention. Many variations and modifications may now occur to those skilled in the art in view of this disclosure. Accordingly, it is intended that the scope of the invention should not be determined by the above description, but rather by a reasonable interpretation of the appended claims.

What is claimed is:

1. An ophthalmic lens die assembly for manufacturing ophthalmic lenses, said lens die assembly comprising:

a lens die having an uninterrupted mold surface for impressing an ophthalmic quality surface on a lens material;

a lens die support having a lens die interface surface removably engaging said lens die, said lens die support having a vacuum channel extending from said lens die interface surface to an external port for connection to a vacuum source, and at least one groove formed on said lens die interface surface and connected to said vacuum channel to permit supply of a vacuum pressure at said lens die interface surface and in said groove, whereby said lens die is secured to said lens die support by the vacuum pressure during the manufacture of the lens.

2. The lens die assembly according claim 1, wherein said lens die has an uninterrupted backing surface that is entirely engaged by said lens die interface surface.

3. The lens die assembly according to claim 2, wherein said lens die interface surface is substantially spherical.

4. The lens die assembly according to claim 2, wherein said lens die is glass.

5. The lens die assembly according to claim 2, wherein a plurality of concentric circular grooves are formed on said lens die interface surface and said vacuum channel is ductively connected to said grooves.

6. The lens die assembly according to claim 5, wherein each groove is less than 1.0 mm wide.

7. The lens die assembly according to claim 5, wherein each groove is less than or equal to 0.6 mm wide.

8. The lens die assembly according to claim 2, wherein a groove cross is formed in said lens die interface surface and crosses at a center of said lens die interface surface, said vacuum channel being ductively connected to said groove cross.

9. The lens die assembly according to claim 8, wherein a plurality of concentric circular grooves are formed on said lens die interface surface and said groove cross ductively interconnects said circular grooves.

10. Ophthalmic lens manufacturing apparatus, comprising:

a pair of ophthalmic lens mold assemblies defining a mold cavity between them;

a mold frame having a passage for inserting lens raw material into said mold cavity;

at least one of said lens mold assemblies including a lens die having an uninterrupted mold surface for impressing an ophthalmic quality surface on the lens material and a lens die support having a lens die interface surface for engaging and supporting said lens die and a vacuum channel which extends through said lens die support from said lens die interface surface and is connectable to a vacuum source, at least one groove being formed on said lens die interface surface and being connected to said vacuum channel to permit supply of a vacuum pressure at said lens die interface surface and in said groove; and a vacuum source connected to said vacuum channel to create the vacuum pressure at said groove in said lens die interface surface, whereby said lens die is secured to said support by vacuum pressure during manufacture of the lens.

11. The lens manufacturing apparatus according to claim 10, further comprising a remover for removing said lens die from said lens die interface surface and an inserter for inserting a replacement lens die on said lens die interface surface, said inserter releasably holding a circumferential edge of the replacement lens.

12. The lens manufacturing apparatus according to claim 11, wherein said remover and said inserter include a robotic grasping device.

13. A process for manufacturing ophthalmic lenses, said process comprising the steps of:

placing a support of a first mold assembly in facing relation to a second mold assembly;

mounting an ophthalmic lens die, having an uninterrupted surface for impressing an ophthalmic quality surface on raw lens material, on said lens die interface surface;

generating vacuum pressure in at least one groove provided on said lens die interface surface of said support through a vacuum channel extending through said support and ductively connected to said groove, to secure said lens die thereto by said vacuum pressure;

inserting raw lens material into said mold cavity;

separating said first and second mold assemblies;

removing the raw lens material as a lens; and removing said lens die.

14. The lens manufacturing process according to claim 13, wherein the vacuum pressure is temporarily interrupted while removing said lens die and inserting said replacement lens die.

15. The lens die assembly according to claim 2, wherein a plurality of suction holes are formed in said lens die interface surface and said vacuum channel is ductively connected to said holes.

16. The lens die assembly according to claim 15, wherein the diameter of each hole is less than 1.0 mm.

* * * * *